(12) United States Patent
Williams et al.

(10) Patent No.: US 11,729,169 B2
(45) Date of Patent: *Aug. 15, 2023

(54) IDENTITY DEFINED SECURE CONNECT

(71) Applicant: Sailpoint Technologies, Inc., Wilmington, DE (US)

(72) Inventors: Cameron Williams, Denver, CO (US); Ryan Privette, Denver, CO (US); Christopher Chad Wheeler, Denver, CO (US); Andrew John Cer, Highlands Ranch, CO (US); Joseph Nathan Zendle, Centennial, CO (US)

(73) Assignee: SailPoint Technologies, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,942

(22) Filed: Dec. 17, 2021

(65) Prior Publication Data
US 2022/0109675 A1   Apr. 7, 2022

Related U.S. Application Data

(63) Continuation of application No. 16/100,068, filed on Aug. 9, 2018, now Pat. No. 11,240,240.
(Continued)

(51) Int. Cl.
*H04L 9/40* (2022.01)
*H04L 12/46* (2006.01)

(52) U.S. Cl.
CPC ...... *H04L 63/0884* (2013.01); *H04L 12/4633* (2013.01); *H04L 12/4641* (2013.01);
(Continued)

(58) Field of Classification Search
CPC ............. H04L 63/0884; H04L 12/4633; H04L 12/4641; H04L 63/0272; H04L 63/062;
(Continued)

(56) References Cited

U.S. PATENT DOCUMENTS 9,098,582 B1    8/2015 Bass
10,262,129 B1 *  4/2019 Gupta ................. H04L 63/0823
(Continued)

OTHER PUBLICATIONS

Notice of Allowance for U.S. Appl. No. 16/258,101, dated May 23, 2022, 11 pgs.
(Continued)

*Primary Examiner* — Dereena T Cattungal
(74) *Attorney, Agent, or Firm* — Sprinkle IP Law Group

(57) ABSTRACT

Systems and methods for network security are provided. Various embodiments issue single use certificates for validating remote endpoints access to the private network. Some embodiments use a triage zone (or triage gateway) to which remote device can calls into using a static issued certificate. However, instead of granting complete access to the virtual private network, the use of this static certificate only grants access to the triage zone where further validation of the endpoint without any access to sensitive content on the private network. The endpoint can be connected to an ID manager within the triage zone. The endpoint can then send the username and password to the ID manager that can create a single use certificate (e.g., valid for a limited period of time). While valid, the single use certificate can be used by the remote device to gain access to the production zone using a VPN tunnel.

21 Claims, 6 Drawing Sheets

Related U.S. Application Data

(60) Provisional application No. 62/543,118, filed on Aug. 9, 2017.

(52) U.S. Cl.
CPC ........ H04L 63/0272 (2013.01); H04L 63/062 (2013.01); H04L 63/0823 (2013.01); H04L 63/0846 (2013.01); H04L 63/0876 (2013.01)

(58) Field of Classification Search
CPC ............. H04L 63/0823; H04L 63/0846; H04L 63/0876
USPC .......................................................... 726/3
See application file for complete search history.

(56) References Cited

U.S. PATENT DOCUMENTS

| | | | |
|---|---|---|---|
| 11,100,209 B2* | 8/2021 | Anjali | H04L 63/0823 |
| 11,245,681 B2* | 2/2022 | Roth | H04L 63/0807 |
| 11,303,633 B1 | 4/2022 | Williams | |
| 11,368,448 B2 | 6/2022 | Privette | |
| 11,463,426 B1 | 10/2022 | Wheeler | |
| 2002/0049883 A1 | 4/2002 | Schneider | |
| 2009/0037729 A1* | 2/2009 | Smith | H04L 9/3263 713/171 |
| 2011/0213965 A1* | 9/2011 | Fu | H04L 63/0823 709/248 |
| 2011/0307436 A1 | 12/2011 | Cai | |
| 2014/0351577 A1* | 11/2014 | Vishal | H04L 9/3226 713/156 |
| 2015/0229477 A1* | 8/2015 | Blair | H04L 9/3228 713/156 |
| 2016/0099916 A1* | 4/2016 | Glazemakers | H04L 63/029 726/12 |
| 2016/0140550 A1* | 5/2016 | Keys | H04L 63/18 726/9 |
| 2022/0086137 A1 | 3/2022 | Vette | |
| 2022/0217143 A1 | 7/2022 | Williams | |

OTHER PUBLICATIONS

Office Action for U.S. Appl. No. 17/181,878, dated Jan. 20, 2022, 5 pgs.
Office Action for U.S. Appl. No. 16/258,101, dated Dec. 24, 2021, 17 pgs.
Jianping Pan, et al., "An Overview of DNS-Based Server Selections in Content Distribution Networks," 2003 Elsevier, 2003, pp. 695-711.
Notice of Allowance for U.S. Appl. No. 16/100,056, dated Feb. 15, 2022, 2 pgs.
Notice of Allowance for U.S. Appl. No. 17/181,878 dated Apr. 27, 2022, 5 pgs.
Office Action issued for U.S. Appl. No. 17/681,297 dated Feb. 17, 2023, 21 pages.
Jon Brodkin, "The secret to online safety . . . " ARs Technica, https://arstechnica.com/information-technology/2013/06/the-secret-to-on ine-safety-lies-random-characters-and-a-password-manager/ (Jun. 3, 2013) (Year: 2013), 21 pages.

* cited by examiner

IDENTITY DEFINED SECURE CONNECT

CROSS REFERENCE TO RELATED APPLICATIONS

This application is a continuation of, and claims a benefit of priority under 35 U.S.C. 120 of, U.S. patent application Ser. No. 16/100,068 filed Aug. 9, 2018, issued as U.S. Pat. No. 11,240,240, entitled "IDENTITY DEFINED SECURE CONNECT", which claims a benefit of priority under 35 U.S.C. 119 to U.S. Provisional Patent Application Ser. No. 62/543,118 filed Aug. 9, 2017, which are incorporated herein by reference in its entirety for all purposes.

TECHNICAL FIELD

Various embodiments of the present technology generally relate to network security. More specifically, some embodiments of the present technology relate systems and methods for identity defined connections to secured networks.

BACKGROUND

Modern electronic devices such as computers, tablets, mobile phones, wearable devices and the like have become an integral part of modern life. These electronic devices can be connected through various networks and/or network components which allowing for access and sharing of files or data, communications (e.g., e-mails and video conferencing), and the like between the electronic devices. Many users of electronic devices routinely utilize various types of software applications for business and personal activities. Examples of software applications can include word processors, spreadsheet applications, e-mail clients, notetaking software, presentation applications, games, computational software, and others. In many cases, businesses rely heavily on these devices to meet customer needs.

The computer networks can include a variety of components (e.g., switches, routers, firewalls, repeaters, or other network nodes) which can be arranged to form complicated network topologies that facilitate the exchange of data. Securing the computing and network resources from various threats is important to prevent unauthorized access of data, denial of service attacks, and the like. As such, many businesses have IT departments responsible for deploying, maintaining, and securing the hardware, services, software applications, data, and network components that make up the network infrastructure. For example, network administrators can set in place various security systems and protocols that can include techniques to authorization or denial of access to data or network infrastructure components (hardware or software).

SUMMARY

Systems and methods are described for network security. More specifically, some embodiments of the present technology relate systems and methods for identity defined connections to secured networks. Some embodiments include a system with multi-zoned security. The system can include a triage zone, an identification database, and a production zone. In some embodiments, the triage zone can also include one or more triage gateways to which a client device can establish a connection using an issued static certificate.

The triage zone can be configured to receive an authentication package (e.g., username and password, device fingerprint, and previous ephemeral token) from a client device. In some embodiments, the triage zone can include a first identity manager to generate, upon successful validation of the authentication package, a production access package that includes an ephemeral token and a dynamic certificate with a common name set to expire at a specific date and time. The ephemeral token, dynamic certificate, and/or other information from the production access package (e.g., address of a production zone gateway) can be transmitted to the client device. The identification database can be in communication with the first identity manager and configured to generate an entry based on the dynamic certificate created by the first identity manager.

The production zone can be separate (e.g., logically and/or physically) from the triage zone the production zone can include a production zone gateway to establish a connection with the client device based on the dynamic certificate, ephemeral token and a username. The production zone can also include a second identity manager in communication with the identification database and the gateway. The second identity manager can verify, by accessing the identification database, that the dynamic certificate provided by the client device is valid.

The client device includes a security agent under control of a processor of the client device. In some embodiments, the security agent can include an identity defined secure connect component to develop a device profile based on hardware and software configurations of the client device. The security agent can also include, in some embodiments, a virtual private networking component to establish the tunnel between the client device and the triage zone and transfer, via the tunnel, a fingerprint to be validated by the first identity manager.

Embodiments of the present invention also include computer-readable storage media containing sets of instructions to cause one or more processors to perform the methods, variations of the methods, and other operations described herein.

Some embodiments provide for a method for operating a security agent on an endpoint device to facilitate connections to a multi-zoned private network with a triage zone and a production zone. The method can include establishing a tunnel between the endpoint device and the triage zone having a static, host dedicated certificate. The method can also include transferring, via the tunnel, an identification package to the triage zone to be used to validate the user. In some embodiments, an ephemeral token, a dynamic certificate having an expiration, and information about a production zone gateway can be received. Using the ephemeral token, the dynamic certificate, and the information about the production zone gateway, a connection to the production zone gateway can be created.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature.

BRIEF DESCRIPTION OF THE DRAWINGS

Embodiments of the present technology will be described and explained through the use of the accompanying drawings in which.

Figure 1:
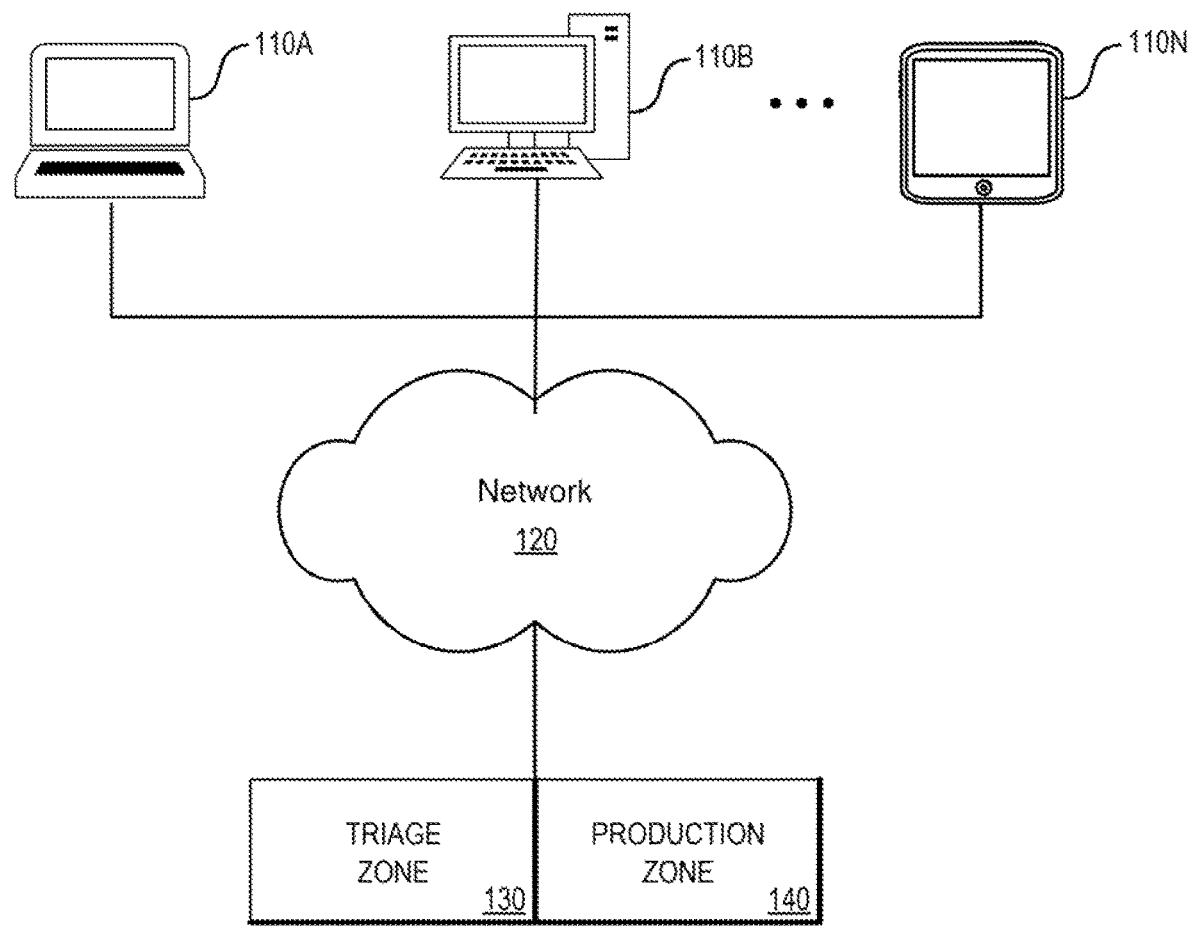
FIG. 1 illustrates an example of an environment which can be used in some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to network security. More specifically, some embodiments of the present technology relate systems and methods for an identity defined secure connection to a private network (e.g., a virtual private network). Virtual private networks are used to extend private networks across public networks. As a result, remote endpoints are able to securely exchange data with a private network via a public network. Security is a major issue as the VPN can allow remotely located devices access to the private network. Attackers try to penetrate networks, obtain privileged account access, interfere with business activities, collect sensitive information and the like.

Traditionally, VPNs have been secured by username/passwords and certificate exchanges. For example, the certificates are often built and then shared with those that should have access to the private network. The passing of this secure information is one of the biggest security risks. Changing the certificates can be a time consuming and difficult task. As a result, many organizations fail to change the certificates as often as would be ideal. This can increase the security risk to the organization as well.

In contrast, various embodiments of the present technology issue single use certificates for validating remote endpoints access to the private network. Some embodiments use a triage zone (or triage gateway). Remote device calls into the triage gateway using an issued certificate. However, instead of granting complete access to the virtual private network the use of this certificate only grants access to the triage zone for further validation of the endpoint without any access to sensitive content on the private network. The endpoint is connected to an ID manager within the triage zone. The endpoint can then send the username and password to the ID manager that can then create a single use certificate (e.g., valid for a limited period of time). While valid, the single use certificate can be used by the remote device to gain access to the production zone using a VPN tunnel.

In addition, common VPN technologies are not conducive to the scale required to issue single user certificates. This is because common PKI authentication only verifies that the certificate (1) was signed by a known, trusted Certificate Authority (CA), (2) the certificate has a valid expiration date, and (3) was not contained in the "Certificate Revocation List" (CRL). A CRL is an explicit list of certificates that are known to be decommissioned. In some embodiments, the gateway still verifies options 1, CA and option 2, expiration, but no CRL is utilized. The gateway forwards identifying information contained in the certificate to the Identity Manager, which is responsible for verifying that the contained information matches an explicitly defined valid certificate. The contained information can include some or all of the following: Country Name, State, Locality Name, Organization Name, Organizational Unit Name, Common Name, Name, and/or Email Address. By validating a positive match against a single valid certificate instead of validating a negative match against a list of many known bad issued certificates, the number of certificates issued and decommissioned does not strain the compute of the gateway or Identity Manager. The number of certificates issued and decommissioned is not a factor affecting the scale of the system.

As the number of authenticating remote endpoints increases, the number of incoming validations of data in the hardware thumbprint increases and may begin to affect the scale of the system. To speed up the processing of these validations, some embodiments of the remote endpoint and identity manager can both create a hashed value calculated on the thumbprint data. This hashed value can then be encrypted with a known, dynamic salt value so that no static value is stored or transferred over the wire. The remote endpoint calculates this hashed value and salted, encrypted result for each update so that the value is not stored on the remote system.

Some embodiments of the identity manager can create the hashed value on each update and stores it locally for efficient lookup. When the identity manager receives an encrypted, salted, hashed thumbprint it can first decrypts the thumbprint. The salt is ignored as its purpose as an abstraction agent has been fulfilled. The hash value provided by the remote endpoint can then be compared to the locally stored hashed value. If the hashed value provided by the remote endpoint matches the hashed value stored by the identity manager, then the identity manager can deduce with high certainty that the remote endpoint is the same validated, previously authenticated remote endpoint. If the hashed values do not match, identity manager is unable to validate the remote endpoint. The underlying information will need to be parsed and any anomaly reported.

Various embodiments of the present technology provide for a wide range of technical effects, advantages, and/or improvements to computing systems, components, and/or operations. For example, various embodiments include one or more of the following technical effects, advantages, and/or improvements: 1) multi-zone security framework; 2) use of a combination of dedicated and dynamic certificates for accessing private networks; 3) remote device validation techniques based on device configurations (e.g., HMAC, storage configuration, memory configuration, OS version, etc.); 4) multi-layered encryption and identity based authentication process; and/or 5) use of tokens for password abstraction. In various embodiments, an agent can be used provide connectivity to the initial triage gateway by enabling connectivity to devices through host-based VPN.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 6:
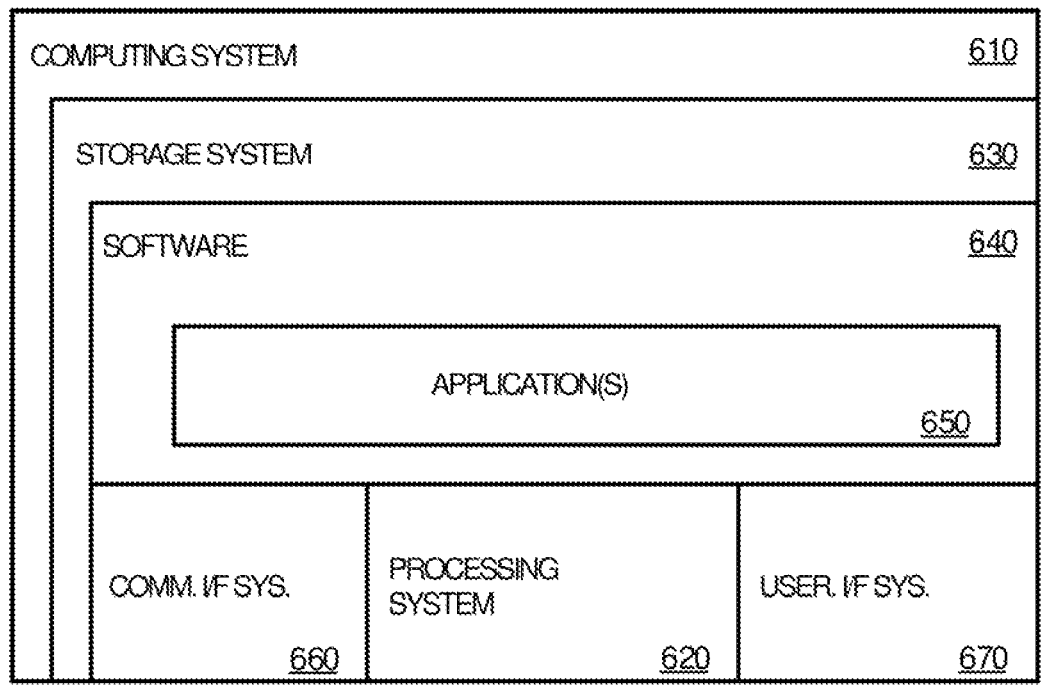
FIG. 6 is an example of a computer system that may be used in some embodiments of the present technology.

FIG. 1 illustrates an example of an environment 100 which can be used in some embodiments of the present technology. As illustrated in FIG. 1, environment 100 may include one or more computing (or endpoint) devices 110A-110N, communications network 120, triage zone 130, and production zone 140. Computing devices 110A-110N can be any computing system capable of running an application natively or in the context of a web browser, streaming an application, or executing an application in any other manner. Examples of computing system 110 include, but are not limited to, personal computers, mobile phones, tablet computers, desktop computers, laptop computers, wearable computing devices, thin client computing devices, virtual and/or augmented reality computing devices, virtual machine hosting a computing environment, distributed application, server computer, computing cluster, application hosted as software as a service (SaaS), application running on a platform as a service (PaaS), application running on an infrastructure as a service (IaaS) or any other form factor, including any combination of computers or variations thereof. One such representative architecture is illustrated in FIG. 6 with respect to computing system 610.

Those skilled in the art will appreciate that various components (not shown) may be included in computing devices 110A-110N to enable network communication with communications network 120. In some cases, communications network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

In some embodiments, remote devices 110A-110N can initially connect to triage zone 130 (e.g., via a triage gateway). Remote devices 110A-110N may have installed a security agent (e.g., agent 300 in FIG. 3) which can establish a connection and call into triage gateway 130 using an issued static certificate, username and password (or other authentication credentials). Triage zone 130 can validate the endpoint device and upon successful validation use an ID manager (not shown in FIG. 1) to generate a dynamic certificate (e.g., a production certificate) granting access to production zone 140. The production certificate can be set to automatically expire at a certain time and include a common name with a device identifier and date/time the certificate was created. The common name can be verified by production zone 140 to ensure validity before granting access to resources within production zone 140.

The initial connection of remote device 110A-110N to triage gateway 130, may not require, in accordance with various embodiments, that the last token or a valid fingerprint to be provided. Instead, additional verification may be used (e.g., multi-factor authentication) for heightened security. However, subsequent attempts may require such information. In some embodiments, an initial registration process may provide initial tokens and fingerprints that can be used in the initial connection. If these components are not present or are invalid, a log or warning may be generated, or access may be denied.

In accordance with various embodiments, triage zone 130 may issue a token and enable dynamic certificate if: 1) the username and password are correct, 2) last token is valid, or 3) fingerprint is valid. Once validated, the agent can receive a token from triage zone 130. In response to receiving the token, the agent on client device 110A-110N can dynamically generate or gather production certificate details which are then passed back to triage zone 130 for the creation of a dynamic certificate. In accordance with various embodiments, the dynamic certificate may only be enabled for a short period of time (e.g., 5, 10, 15, or 30 minutes). The agent can then authenticate to the production zone 140 with the static certificate, username, and token. In some embodiments, further validation can be enabled on subsequent connections by tracking a rolling token, and identifying the agent device via hardware, software, and other configuration parameters.

Figure 2:
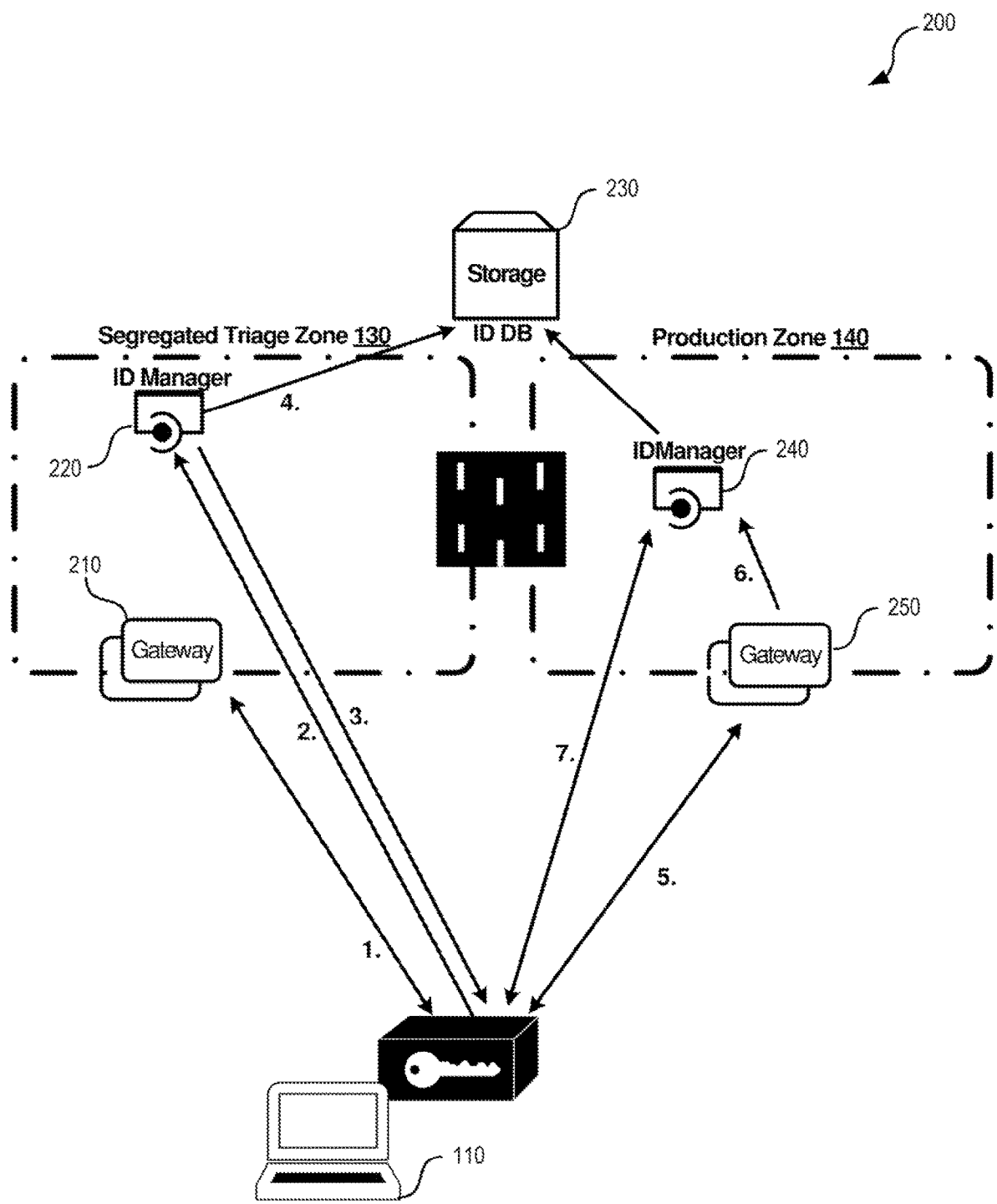
FIG. 2 illustrates an example of the communication flow between various components that may be used in various embodiments of the present technology.

FIG. 2 illustrates an example of the communication flow 200 between various components that may be used in various embodiments of the present technology. As illustrated in FIG. 2, remote client device 110, gateway 210 to triage zone 130, ID manager 220, ID database 230, ID manager 240 and gateway 250 to production zone 140. As illustrated in FIG. 2, remote client device 110 can create a tunnel (1) from the endpoint device 110 to gateway 210 in triage zone 130 using a static, host dedicated certificate. Once the tunnel is established, remote client device 110 can register (2) the identity of the user (e.g., using an application programming interface to transmit a basic username and password) with ID manager 220.

In some embodiments, remote client device 110 can provide to ID manager 220 in triage zone 130 information such as, but not limited to, a universally unique identifier (UUID), hostname, username and password, certificate common name (if present), last token (if present), system information (e.g., in the form of a fingerprint) and/or other information. In response, ID manager 220 can provide (3), to remote client 110, an address to a production gateway 250, production certificate, a token, a common name, and/or other information that can be used to connect to production zone 140. In some embodiments, ID manager 220 can set the common name to expire in a short period of time (e.g., 15 minutes, 20 minutes, etc.) by updating (4) an entry in ID database 230.

Remote client 110 can then use (5) the address of production gateway 250 received from ID manager 220 in triage zone 130 to establish a tunnel to production zone 140. Remote client 110 can authenticate with the provided certificate, username, and token. The VPN authentication (6) 140 verifies that the certificate is valid before granting access to resources in production zone. In some embodiments, ID manager 240 can verify the certificate is valid by verifying the common name matches the entry in ID database 220 and that the entry is enabled. One advantage of having each certificate automatically expire is that the automated expiry of the certificate allows infinite certificate scale with no revocation. ID manager 240 can also validate the username and token. As such, the username and password can be validated without having to pass the username and password.

In some embodiments, ID manager 240 can establish an identity loop (7) with remote client 110. For example, in some embodiments an agent running on remote client 110 can post username, UUID, token, and fingerprint on demand, on a set schedule (e.g., a periodic schedule), or the like. In response, ID manager 240 can set a dynamic, rolling token update that can be distributed to the agent on remote client device 110. The agent can update the validation package and confirm the change with ID manager 240. Once the confirmation is received, ID manager 240 can set a common name expiry to a preset of fixed amount of time in the future (e.g. current time+15 minutes).

Database 230 can include a variety of entries that include information regarding production certificates, host information, gateway information, and the like. For example, the host information can include one or more of the following fields: a UUID or hostname, isregistered, common name, common name expiry, active token, intermediateToken (e.g., a placeholder token until agent confirms data), gateway ID, certificate, biodata (e.g., including ssl signable: mac addresses, UUID, CPU ct, CPU type, uptime (uptime>last uptime+delta=bad), OS/variant, storage/partitions, salt (UTC:YYYYMMDDHHMMSS), and the like. The gateway information can include hostname, certificate authority key (ca.key), certificate authority certificate (ca.crt), and the like.

Figure 3:
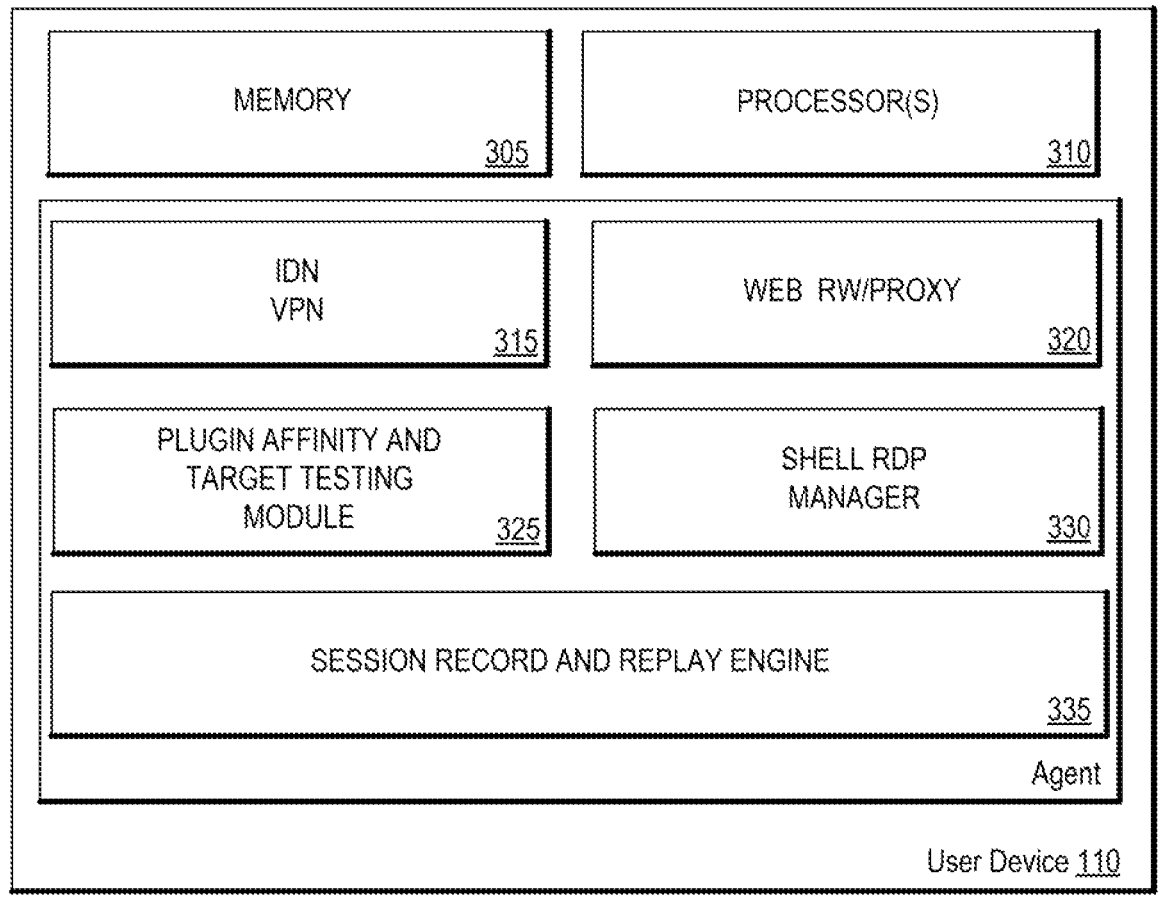
FIG. 3 illustrates a set of components within a user device that may be used in one or more embodiments of the present technology.

FIG. 3 illustrates a set of components within a user device 300 that may be used in one or more embodiments of the present technology. As illustrated in FIG. 3, user device can include memory 305 (e.g., volatile memory and/or nonvolatile memory), processor(s) 310 for executing processing instructions, and an agent. The agent can include IDN/VPN 315, web rewrite/proxy 320, plugin affinity and target testing module, 325, shell RDP manager 330, and a session record and replay engine 335. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information. In accordance with some embodiments of the present technology, memory 305 can encompass any type of, but is not limited to, volatile memory, nonvolatile memory and dynamic memory. For example, memory 305 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 305.

Memory 305 may be used to store instructions for running one or more applications or modules on processor(s) 310. For example, memory 305 could be used in one or more embodiments to house all or some of the instructions needed to execute the functionality of IDN/VPN 315, web rewrite/proxy 320, plugin affinity and target testing module 325, shell RDP manager 330, and a session record and replay engine 335. User device 300 may also include an operating system that provides a software package that is capable of managing various hardware resources.

Processor(s) 310 are the main processors of user device 300 used to control the operation of user device 300 which may include various application processors, coprocessors, and other dedicated processors for operating user device 300. The volatile and nonvolatile memories found in various embodiments may include storage media for storing information such as processor-readable instructions, data structures, program modules, or other data. Some examples of information that may be stored include basic input/output systems (BIOS), operating systems, and applications.

IDN/VPN 315 can be an identify defined VPN networking component that can build a tunnel from the endpoint device to a private network (e.g. triage zone 130 or production zone 140). In accordance with various embodiments, IDN/VPN 315 can create the tunnel using a variety of tunneling protocols such as, but not limited to, IP in IP (IPIP), SIT/IPv6, Generic Routing Encapsulation (GRE), Secure Socket Tunneling Protocol (SSTP), Internet Protocol Security (IPSec), Layer 2 Tunneling Protocol (L2TP), Virtual Extensible Local Area Network (VXLAN), SSL VPN, or the like. In accordance with various embodiments, IDN/VPN 315 can determine the identity of the endpoint device, check for any changes to the hardware and software configurations of the endpoint device, and if no issues are identified then IDN/VPN can initiate a tunnel to the private network. IDN/VPN can then exchange ID's for registration.

Web rewrite/proxy 320 can listen for connection details (e.g., login credentials) from specific connections. In some embodiments, web rewrite/proxy 320 monitor specific TCP ports and can inject credentials sent by a triage zone. Plugin affinity and target testing module 325 can check the availability of the agent. In some embodiments, the confirmation of availability may also include time to live (TTL) and recheck availability upon expiration. If at any point plugin affinity and target testing module 325 cannot validate the agent, then the tunnel created by IDN/VPN 315 can be terminated. Shell RDP manager 330 waits for connection details or information being sent from the head end via the tunnel. In response, shell RDP manager 330 initiates connections to shell RDP.

Session record and replay engine 335 can receive record activity information (e.g., snapshots, no activity messages, etc.) received from a plugin within the web portal/browser. For example, in some embodiments the plugin may take screenshots at designated intervals (e.g., 500 ms) and send those snapshots to session record and replay engine 335 which routes that record activity information to a storage facility where automated or manual techniques can be used for additional real-time monitoring (e.g., using artificial intelligence or other data analysis tools) or auditing.

Figure 4:
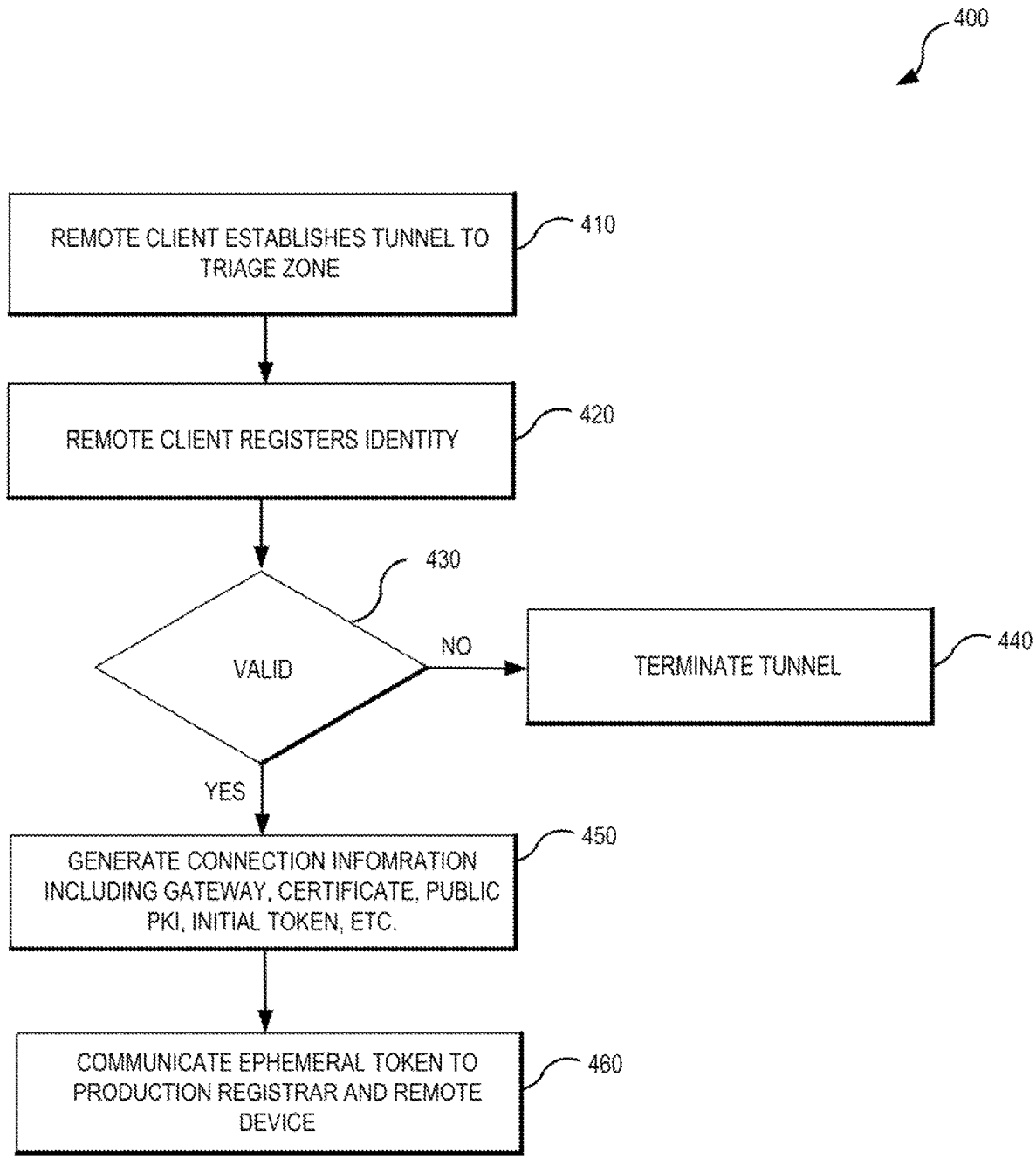
FIG. 4 is a flowchart illustrating an example of a set of operations that may be used to process a connection request within a triage zone in accordance with various embodiments of the present technology.

FIG. 4 is a flowchart illustrating an example of a set of operations 400 that may be used to process a connection request within a triage zone in accordance with various embodiments of the present technology. As illustrated in FIG. 4, a remote client can establish a tunnel to a triage zone during tunneling operation 410. In some embodiments, the tunnel may use a static, host dedicated certificate. During registration operation 420 the remote client can register with the triage zone using a variety of information such as usernames/passwords, keys, pins, tokens, biodata (e.g., MAC addresses, UUID, CPU ct, CPU type, uptime, OS version, storage/partition information, etc.) and the like. Determination operation 430 can determine whether the information provided by the remote client is valid and warrants access.

When determination operation 430 determines that the information is not valid, then determination operation 430 branches to termination operation 440 that terminates the tunnel connection between the triage zone and the remote device endpoint. When determination operation 430 determines that the information is valid, then determination operation 430 branches to generation operation 450 where connection information (e.g., gateway, certificate, public PKI, initial token, etc.) is generated. Communication operation 460 communicates an ephemeral token and/or other connection information to a registrar and remote device. The remote device can use this connection information to connect with a production zone to access protected recourse.

To speed up the processing of these validations, some embodiments can use hashed values calculated on thumbprint data. This hashed value can then be encrypted with a known, dynamic salt value so that no static value is stored or transferred over the wire. The remote endpoint calculates this hashed value and salted, encrypted result for each update so that the value is not stored on the remote system.

Some embodiments can create the hashed value on each update and store the updated hashed value locally for efficient lookup. When an encrypted, salted, hashed thumbprint is received, the thumbprint can be decrypted. The salt can be ignored as its purpose as an abstraction agent has been fulfilled, while the hash value provided by the remote endpoint can then be compared to the locally stored hashed value. If the hashed value provided by the remote endpoint matches the stored hashed value, then the identity manager can conclude with high certainty that the remote endpoint is the same validated, previously authenticated remote endpoint. If the hashed values do not match, the remote endpoint is not validated and the underlying information can be parsed and any anomaly reported.

To enable authentication without saving the users password, triage zone (e.g., 130 in FIG. 1) can issue the ephemeral token (e.g., a token that expires at a specific date and time) and an agent on remote device can write the token to a local file which can be used to access the production zone. Periodically, the agent can also update this token as an additional authentication mechanism for subsequent connections to triage zone. As such, the username and password are not passed via the VPN connection.

Figure 5:
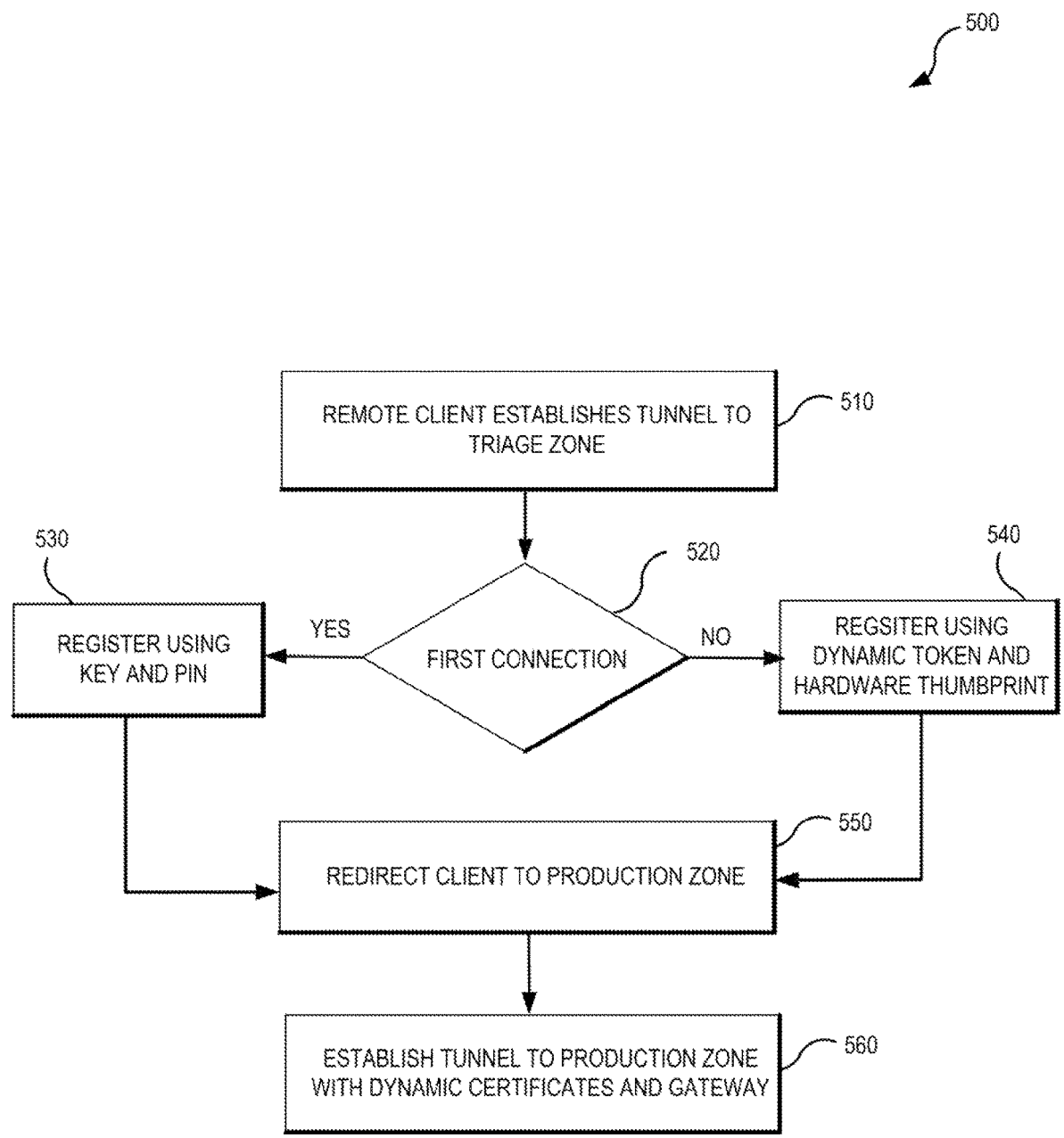
FIG. 5 is a flowchart illustrating an example of a set of operations that may be used for establishing a tunnel connection to a production zone in accordance with some embodiments of the present technology.

FIG. 5 is a flowchart illustrating an example of a set of operations 500 that may be used for establishing a tunnel connection to a production zone in accordance with some embodiments of the present technology. As illustrated in FIG. 5, tunneling operation 510 establishes a tunnel between a remote device and a triage zone. Once connected, the triage zone determines whether the device has connected before using determination operation 520. When determination operation 520 determines that this is the first connection of the remote device to the triage zone, then determination operation 520 branches to registration operation 520 where the device can be registered using a key and pin (or other authentication factors). When determination operation 520 determines that the remote device has previously connected to the triage zone, then determination operation 520 branches to registration operation 540 where the remote device is registered using a dynamic token and hardware fingerprint.

Upon success registration from registration operation 530 or 540, redirection operation 550 redirects the remote client to the production zone. In accordance with various embodiments, redirection operation 550 can include sending a variety of information to the remote client. For example, this information can include, but is not limited to, dynamically created certificates that allow for single use or limited time for use, tokens, gateway information, and the like. Connection operation 560 can then establish a tunnel to the production zone with dynamic certificates and gateway.

Exemplary Computer System Overview

Aspects and implementations of the imaging system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

FIG. 6 illustrates computing system 610, which is representative of any system or collection of systems in which the various applications, services, scenarios, and processes disclosed herein may be implemented. For example, computing system 610 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 610 may be implemented as a single apparatus, system, or device or may be implemented in a distributed manner as multiple apparatuses, systems, or devices. Computing system 610 includes, but is not limited to, processing system 620, storage system 630, software 640, applications 650, communication interface system 660, and user interface system 670. Processing system 620 is operatively coupled with storage system 630, communication interface system 660, and an optional user interface system 670.

Processing system 620 loads and executes software 640 from storage system 630. When executed by processing system 620 for deployment of scope-based certificates in multi-tenant cloud-based content and collaboration environments, software 640 directs processing system 620 to operate as described herein for at least the various processes, operational scenarios, and sequences discussed in the foregoing implementations. Computing system 610 may optionally include additional devices, features, or functionality not discussed for purposes of brevity.

Referring still to FIG. 6, processing system 620 may comprise a micro-processor and other circuitry that retrieves and executes software 640 from storage system 630. Processing system 620 may be implemented within a single processing device, but may also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 may comprise any computer readable storage media readable by processing system 620 and capable of storing software 640. Storage system 630 may include volatile and nonvolatile, removable and non-removable media implemented in any method or technology for storage of information, such as computer readable instructions, data structures, program modules, or other data. Examples of storage media include random access memory, read only memory, magnetic disks, nonvolatile memory, battery backed memory, Non-Volatile DIMM memory, phase change memory, memristor memory, optical disks, flash memory, virtual memory and non-virtual memory, magnetic cassettes, magnetic tape, magnetic disk storage or other magnetic storage devices, or any other suitable storage media.

In addition to computer readable storage media, in some implementations storage system 630 may also include computer readable communication media over which at least some of software 640 may be communicated internally or externally. Storage system 630 may be implemented as a single storage device, but may also be implemented across multiple storage devices or sub-systems co-located or distributed relative to each other. Storage system 630 may comprise additional elements, such as a controller, capable of communicating with processing system 620 or possibly other systems.

Software 640 may be implemented in program instructions and among other functions may, when executed by processing system 620, direct processing system 620 to operate as described with respect to the various operational scenarios, sequences, and processes illustrated herein. For example, software 640 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 640 may include additional processes, programs, or components, such as operating system software, virtual machine software, or application software. Software 640 may also comprise firmware or some other form of machine-readable processing instructions executable by processing system 620.

In general, software 640 may, when loaded into processing system 620 and executed, transform a suitable apparatus, system, or device (of which computing system 610 is representative) overall from a general-purpose computing system into a special-purpose computing system. Indeed, encoding software on storage system 630 may transform the physical structure of storage system 630. The specific transformation of the physical structure may depend on various factors in different implementations of this description. Examples of such factors may include, but are not limited to, the technology used to implement the storage media of storage system 630 and whether the computer-storage media are characterized as primary or secondary storage, as well as other factors.

For example, if the computer readable storage media are implemented as semiconductor-based memory, software 640 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 660 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 670 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 670. In some cases, the input and output devices may be combined in a single device, such as a display capable of displaying images and receiving touch gestures. The aforementioned user input and output devices are well known in the art and need not be discussed at length here. In some cases, the user interface system 670 may be omitted when the computing system 610 is implemented as one or more server computers such as, for example, blade servers, rack servers, or any other type of computing server system (or collection thereof).

User interface system 670 may also include associated user interface software executable by processing system 620 in support of the various user input and output devices discussed above. Separately or in conjunction with each other and other hardware and software elements, the user interface software and user interface devices may support a graphical user interface, a natural user interface, an artificial intelligence (AI) enhanced user interface that may include a virtual assistant or bot (for example), or any other type of user interface, in which a user interface to an imaging application may be presented.

Communication between computing system 610 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system for computer security, the system comprising:
    a triage zone and a production zone logically or physically separate from the triage zone, wherein a set of protected resource can be accessed through the production zone but cannot be accessed through the triage zone, and wherein:
        the triage zone is adapted to obtain an authentication request associated with a client device, the triage zone including:
            an identity manager to, upon successful validation in association with the authentication request, generate an ephemeral token and enable an associated dynamic certificate set to expire at a specific time, and to create or update a stored entry based on the dynamic certificate, wherein the ephemeral token is adapted to be provided to the client device to allow access to the production zone, and not the triage zone, based on the associated dynamic certificate;
        the production zone adapted to:
            establish a connection with the client device based on the dynamic certificate, ephemeral token, and a username; and
            verify, by accessing the stored entry, that the authentication request provided by the client device is valid.

2. The system of claim 1, wherein the authentication request is verified using a common name associated with the dynamic certificate.

3. The system of claim 1, wherein successful validation comprises validating a correct username and password, validating a last token or validating a fingerprint.

4. The system of claim 1, wherein the client device establishes a connection to the triage zone using a static certificate and the ephemeral token.

5. The system of claim 1, wherein the client device establishes a subsequent connection to the triage zone using a rolling token.

6. The system of claim 1, wherein the rolling token is refreshed using an identity loop established with the first identity manager or the production zone.

7. The system of claim 1, wherein verifying that the authentication request provided by the client is valid comprises verifying that a common name associated with the authentication request matches the stored entry and the dynamic certificate is enabled.

8. A method, for network security, comprising:
providing a triage zone and a production zone logically or physically separate from the triage zone, wherein a set of protected resource can be accessed through the production zone but cannot be accessed through the triage zone, and wherein:
the triage zone is adapted to obtain an authentication request associated with a client device, the triage zone including:
an identity manager to, upon successful validation in association with the authentication request, generate an ephemeral token and enable an associated dynamic certificate set to expire at a specific time, and to create or update a stored entry based on the dynamic certificate, wherein the ephemeral token is adapted to be provided to the client device to allow access to the production zone, and not the triage zone, based on the associated dynamic certificate;
wherein the production zone is adapted to:
establish a connection with the client device based on the dynamic certificate, ephemeral token, and a username; and
verify, by accessing the stored entry, that the authentication request provided by the client device is valid.

9. The method of claim 8, wherein the authentication request is verified using a common name associated with the dynamic certificate.

10. The method of claim 8, wherein successful validation comprises validating a correct username and password, validating a last token or validating a fingerprint.

11. The method of claim 8, wherein the client device establishes a connection to the triage zone using a static certificate and the ephemeral token.

12. The method of claim 8, wherein the client device establishes a subsequent connection to the triage zone using a rolling token.

13. The method of claim 8, wherein the rolling token is refreshed using an identity loop established with the first identity manager or the production zone.

14. The method of claim 8, wherein verifying that the authentication request provided by the client is valid comprises verifying that a common name associated with the authentication request matches the stored entry and the dynamic certificate is enabled.

15. A non-transitory computer readable medium, comprising instructions for:
providing a triage zone and a production zone logically or physically separate from the triage zone, wherein a set of protected resource can be accessed through the production zone but cannot be accessed through the triage zone, and wherein:
the triage zone is adapted to obtain an authentication request associated with a client device, the triage zone including:
an identity manager to, upon successful validation in association with the authentication request, generate an ephemeral token and enable an associated dynamic certificate set to expire at a specific time, and to create or update a stored entry based on the dynamic certificate, wherein the ephemeral token is adapted to be provided to the client device to allow access to the production zone, and not the triage zone, based on the associated dynamic certificate;
wherein the production zone is adapted to:
establish a connection with the client device based on the dynamic certificate, ephemeral token, and a username; and
verify, by accessing the stored entry, that the authentication request provided by the client device is valid.

16. The non-transitory computer readable medium of claim 15, wherein the authentication request is verified using a common name associated with the dynamic certificate.

17. The non-transitory computer readable medium of claim 15, wherein successful validation comprises validating a correct username and password, validating a last token or validating a fingerprint.

18. The non-transitory computer readable medium of claim 15, wherein the client device establishes a connection to the triage zone using a static certificate and the ephemeral token.

19. The non-transitory computer readable medium of claim 15, wherein the client device establishes a subsequent connection to the triage zone using a rolling token.

20. The non-transitory computer readable medium of claim 15, wherein the rolling token is refreshed using an identity loop established with the first identity manager or the production zone.

21. The non-transitory computer readable medium of claim 15, wherein verifying that the authentication request provided by the client is valid comprises verifying that a common name associated with the authentication request matches the stored entry and the dynamic certificate is enabled.

* * * * *